(12) United States Patent
Kapgan

(10) Patent No.: US 6,846,226 B2
(45) Date of Patent: Jan. 25, 2005

(54) BURR REMOVAL APPARATUS

(76) Inventor: Michael Kapgan, 1419 St. Kitts La., Foster City, CA (US) 94044

( * ) Notice: Subject to any disclaimer, the term of this patent is extended or adjusted under 35 U.S.C. 154(b) by 395 days.

(21) Appl. No.: 09/850,908

(22) Filed: May 7, 2001

(65) Prior Publication Data
US 2002/0013988 A1 Feb. 7, 2002

Related U.S. Application Data
(60) Provisional application No. 60/214,829, filed on Jun. 28, 2000.

(51) Int. Cl.$^7$ ................................................ B24B 9/02
(52) U.S. Cl. ............................. 451/61; 451/51; 451/65; 451/107
(58) Field of Search ........................... 451/61, 51, 107, 451/131, 108, 180, 440, 495, 504, 508, 541, 547

(56) References Cited

U.S. PATENT DOCUMENTS

| | | | |
|---|---|---|---|
| 2,514,394 A | | 7/1950 | Irving |
| 3,871,139 A | | 3/1975 | Rands |
| 4,136,487 A | * | 1/1979 | Khokhulin et al. ......... 451/121 |
| 4,343,577 A | | 8/1982 | Purdon |
| 4,690,594 A | | 9/1987 | Kato |
| 4,993,196 A | * | 2/1991 | Kobayashi et al. ............ 451/61 |
| 5,177,904 A | * | 1/1993 | Nagel et al. .................. 451/27 |
| 5,384,983 A | * | 1/1995 | Siggelin ....................... 451/65 |
| 5,482,498 A | * | 1/1996 | Higashikawa ................ 451/61 |
| 5,795,217 A | | 8/1998 | LaPlante et al. |
| 5,899,796 A | * | 5/1999 | Kamiyama et al. ........... 451/61 |
| 6,569,177 B1 | * | 5/2003 | Dillard et al. .............. 606/168 |

FOREIGN PATENT DOCUMENTS

| | | | |
|---|---|---|---|
| DE | 199 04 944 A1 | 2/1999 | |
| JP | 352053594 A | * 4/1977 | .................. 451/61 |
| JP | 05 301173 A | 11/1993 | |
| JP | 08 192344 A | 7/1996 | |

OTHER PUBLICATIONS

LaRoux K. Gillespie, Deburring and Edge Finishing Handbook, 1999, pp. 237–288.
International Search Report; PCT/US01/20803.

* cited by examiner

Primary Examiner—Lee D. Wilson
Assistant Examiner—Anthony Ojini
(74) Attorney, Agent, or Firm—Knobbe Martens Olson & Bear LLP

(57) ABSTRACT

Apparatus for removing a burr from an aperture in a workpiece, using a rotating deburring tool having a flexible or partly flexible shaft, an abrasive mechanism that rotates on the shaft and a collar that protects the workpiece from abrasion when the abrasive mechanism is being positioned for deburring. Optionally, the shaft and abrasive mechanism move laterally as they rotate. Optionally, a shaft holder includes a protective surrounding sleeve to catch or deflect any fragment of the shaft holder that might fly off. Optionally, the shaft and the workpiece rotate independently of each other. Two or more different abrasive mechanisms can be simultaneously attached to the shaft. The cross-sectional shape of the abrasive mechanism may be curvilinear and/or polygonal, depending upon shape of the workpiece surface. Optionally, a shaft restrictor receives the shaft and limits lateral motion of the rotating shaft. The shaft optionally includes a rotatable mass that provides additional rotational inertia after the shaft is initially spun up.

16 Claims, 19 Drawing Sheets

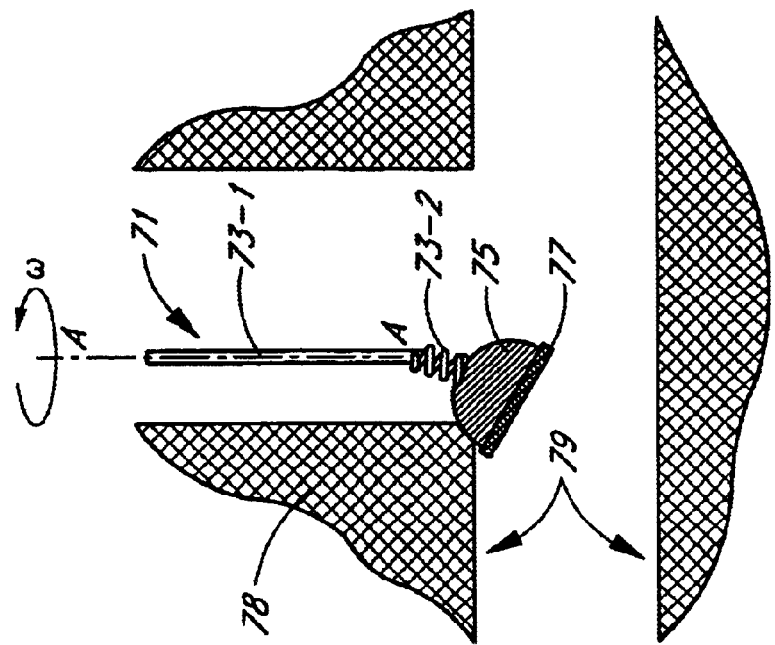
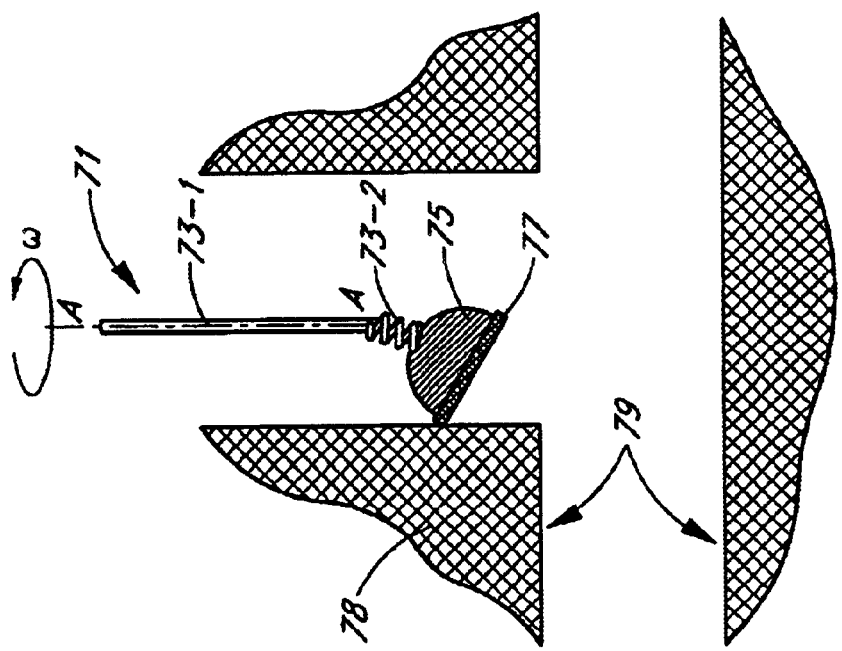

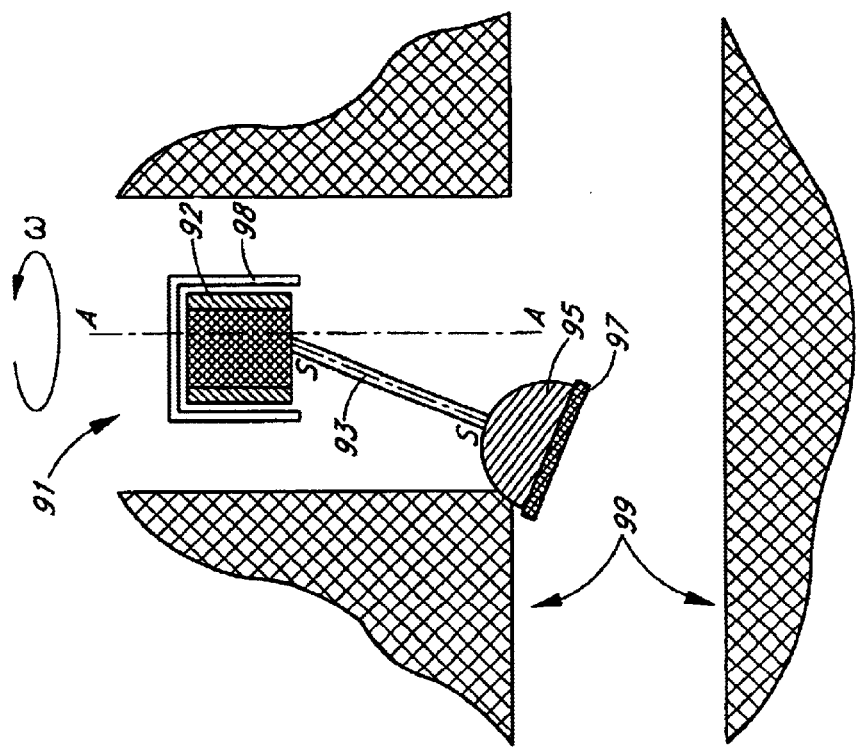
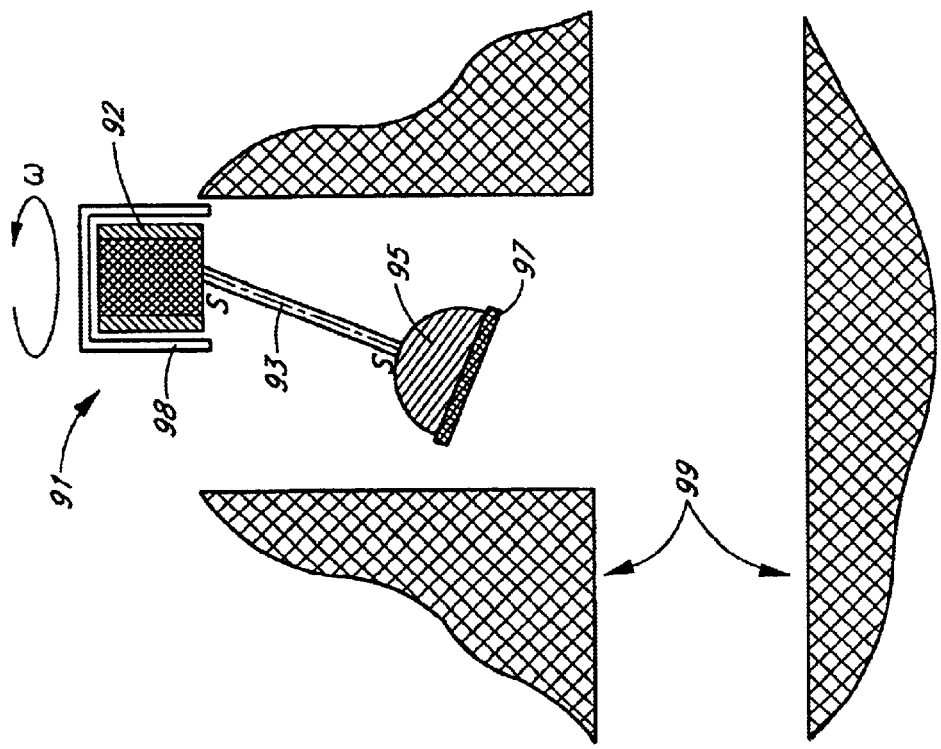
FIG. 9A
FIG. 9B

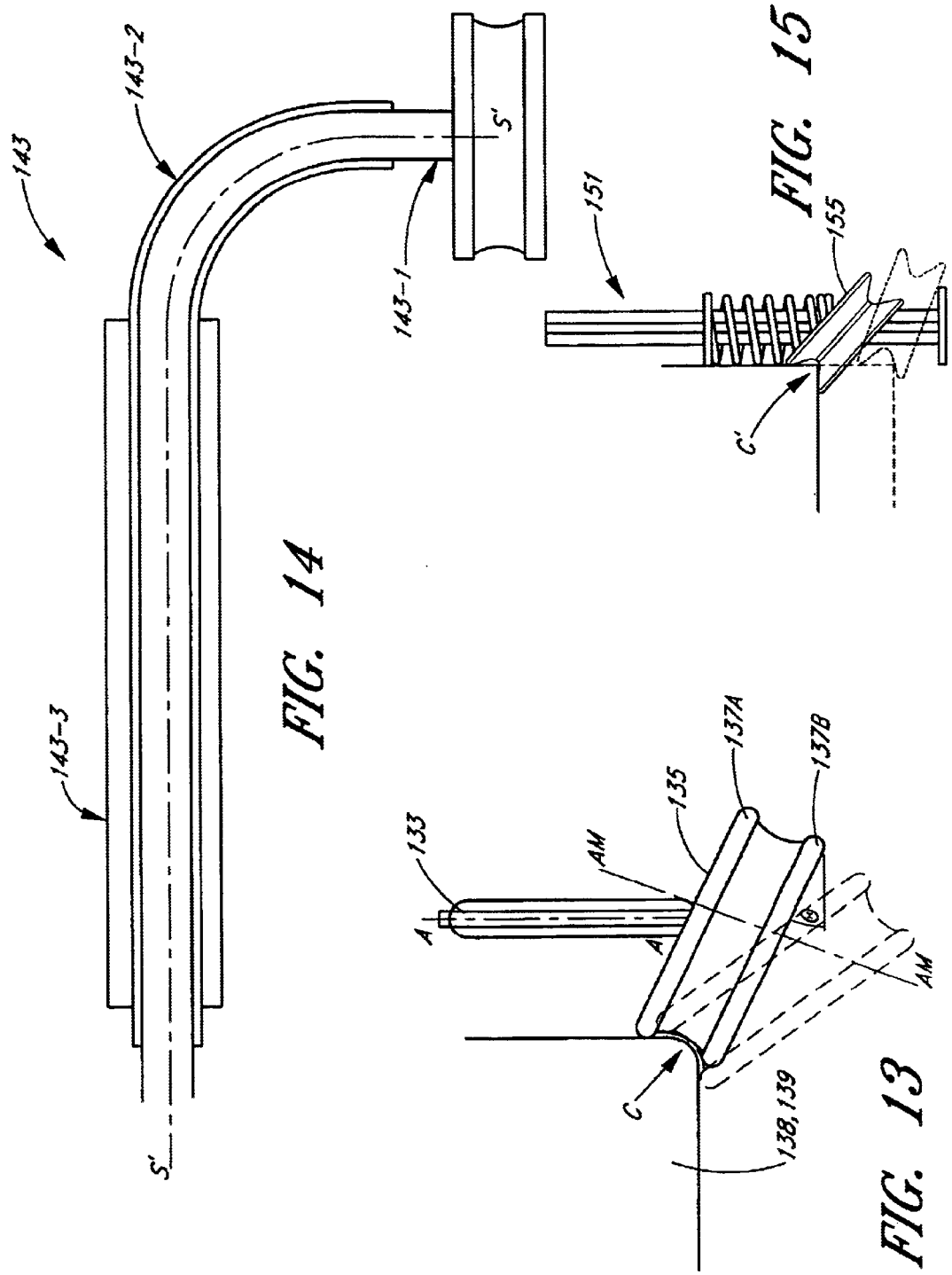

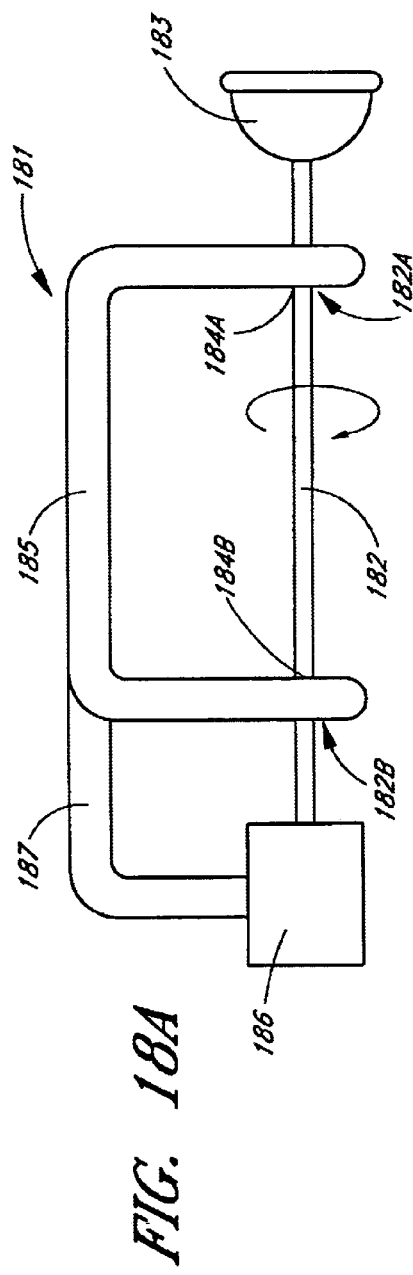
FIG. 18A
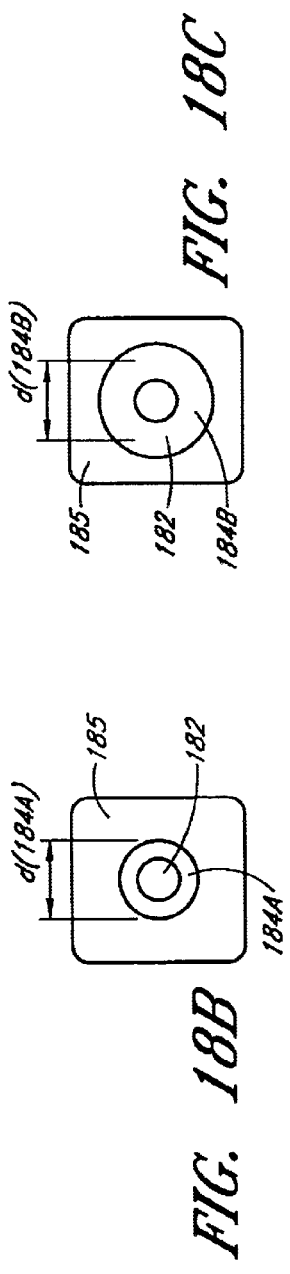
FIG. 18B
FIG. 18C
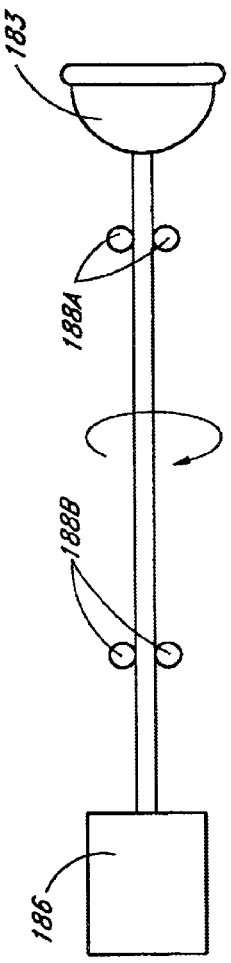
FIG. 18D

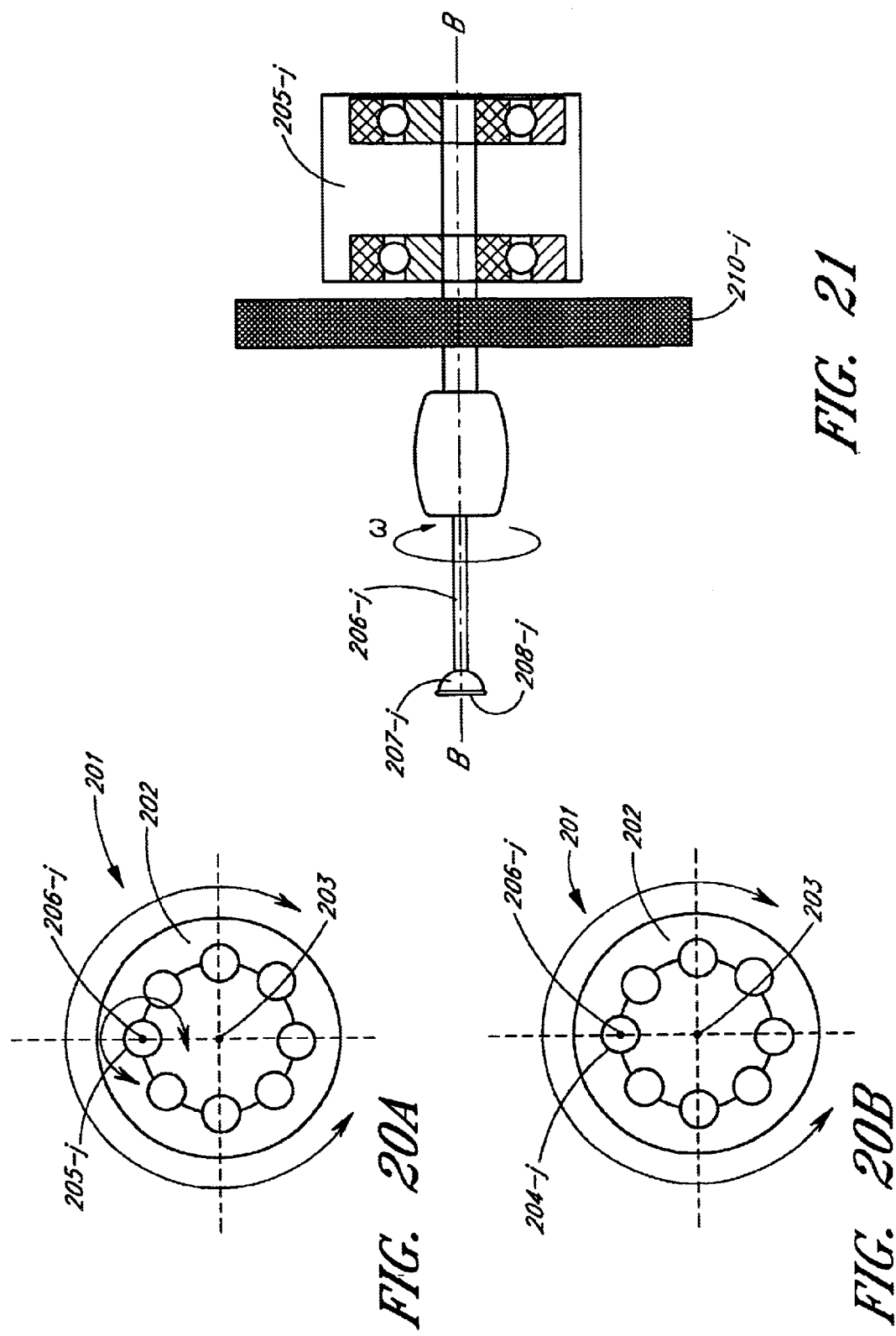

BURR REMOVAL APPARATUS

This application claims priority based on a Provisional Application, Ser. No. 60/214,829, filed on Jun. 28, 2000 by the inventor named herein and entitled "BURR REMOVAL APPARATUS." This invention relates to removal of burrs and similar unwanted projections from metals and other relatively hard materials.

FIELD OF THE INVENTION

Background of the Invention

Removal of undesirable projections (collectively referred to as "burrs" herein) from a surface, such as a metal or other relatively hard material, is important in the metal finishing industry, especially where presence of an unremoved burr can interfere with flow of a liquid or with the positioning of electrical charge-carrying lines. Producers of vehicles, such as automotive vehicles, water-borne vehicles and aircraft are especially concerned with burr removal on surfaces of tubes, cylinders and other containers and housings. However, many of the surfaces that contain burrs (referred to herein as "burred surfaces") are relatively inaccessible, located in small spaces and cannot be de-burred by a conventional de-burring tool. For example, when two intersecting vias or apertures are drilled in a metal, breakthough of the drill for the second aperture into the space that is part of the first aperture will often produce a large metal burr at or near the intersection.

Further, in some situations two or different burr removal materials may be needed within a single container or housing. One example occurs where rough burr removal is to be followed by finishing, each requiring a different burr removal material or tool shape. Another example occurs when a container includes two or more different materials, each with a burred surface that requires its own burr removal mechanism and associated material.

When a burr removal tool is positioned to remove a burr, operation of the tool may unintentionally, and undesirably, contact and remove material that is preferably left intact. A burr removal tool often has a connecting rod extending between an abrasive nodule used for burr removal and a motor that provides mechanical movement of the nodule. Occasionally, the nodule briefly binds against the material to be removed, causing the rod to move laterally or in another uncontrollable manner.

What is needed is a burr removal tool that is flexible for reaching around obstructions and corners, can fit into relatively small spaces, provides two or more different burr removal materials in a single tool, and provides protection of a burred surface as the tool is moved into position for burr removal. Preferably, the tool should be small and flexible enough to permit rapid interchange of one type of burr removal mechanism by another. Preferably, the shape of the burr removal nodule should be chosen to minimize the amount of non-burr material that is removed. Preferably, motion of the shaft should be controlled to prevent occurrence of undesired excursions when the burr removal nodule temporarily binds against material being removed.

SUMMARY OF THE INVENTION

These needs are met by the invention, which provides apparatus having one, two or more different abrasive mechanisms, attached to a rotatable shaft and having one or more non-abrasive collars thereon in one embodiment.

An approximately cylindrically symmetric abrasive mechanism, including an exposed abrasive material (preferably with Mohs hardness at least about 5.5), is attached to a rotatable shaft, and a collar of relatively non-abrasive material (prefereably with Mohs hardness much lees than 5.5) is attached to the shaft and/or to the abrasive mechanism adjacent to the abrasive mechanism. The shaft is optionally flexible and can be bent or deformed or tilted as the shaft rotates to expose a portion of the abrasive material to remove one or more exposed burrs. Presence of the non-abrasive collar allows the shaft to be moved into position and applied for burr removal at one location on a surface without scoring or otherwise abrading another portion of the surface. Optionally, the workpiece including the burred surface may rotate instead of, or independently of, the rotating shaft.

Optionally, the cross-sectional shape of the burr removal nodule is chosen to be ovular, quadrilateral, trapezoidal or polygonal to minimize undesirable removal of adjacent material. Optionally, a shaft restrictor is provided to control or prevent lateral excursions of the shaft in one direction.

In another embodiment, two or more approximately cylindrically symmetric abrasive mechanisms are separated by a space or by a non-abrasive collar and are attached to a rotatable shaft. Optionally, each of the abrasive mechanisms includes a different abrasive material so that the burr removal apparatus can be applied to different surfaces or materials without removing the burr removal apparatus to change from one abrasive material to another. A flexible shaft may include a flexible spring as a portion of the shaft, Alternatively, a shaft may be attached or rooted at one end thereof to a flexible material, such as rubber, that allows the direction of the shaft to be varied by applying force to one side of the shaft to force the shaft against the workpiece surface. Alternatively, one or more small abrasive nodules, each attached to a shaft by a transversely extending rod, may be rotated with the shaft to remove one or more burrs.

In another embodiment, a shaft restrictor is provided to restrict lateral movement of the shaft in one or more lateral directions, to discourage the shaft from binding against a work surface being deburred. In another embodiment, the shaft is provided with an additional rotatable mass that maintains angular velocity of the shaft in the presence of frictional forces, even where a rotational drive mechanism for the shaft is turned off.

BRIEF DESCRIPTION OF THE DRAWINGS

FIGS. 7A, 7B, 8A, 8B, 9A and 9B illustrate systems with combined flexible and inflexible shafts and flexible shaft holders.

FIGS. 13, 14 and 15 illustrate use of a superflexible shaft to drive an abrasive mechanism.

FIGS. 18A–18D and 19 illustrate use of types of shaft restrictors constructed according to the invention.

FIGS. 20A, 20B and 21 illustrate use of the invention mounted on a rotating machine, such as a milling machine or lathe.

DESCRIPTION OF THE INVENTION

Figure 1A:
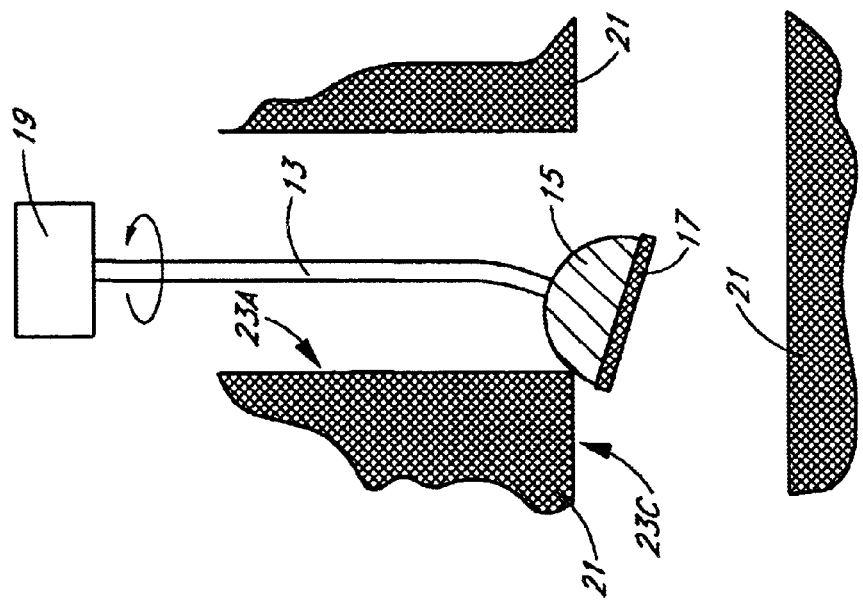
FIGS. 1A, 1B, 4A and 4B, 5 and 6 illustrate use of single and multiple abrasive mechanisms as part of the invention.
Figure 1B:
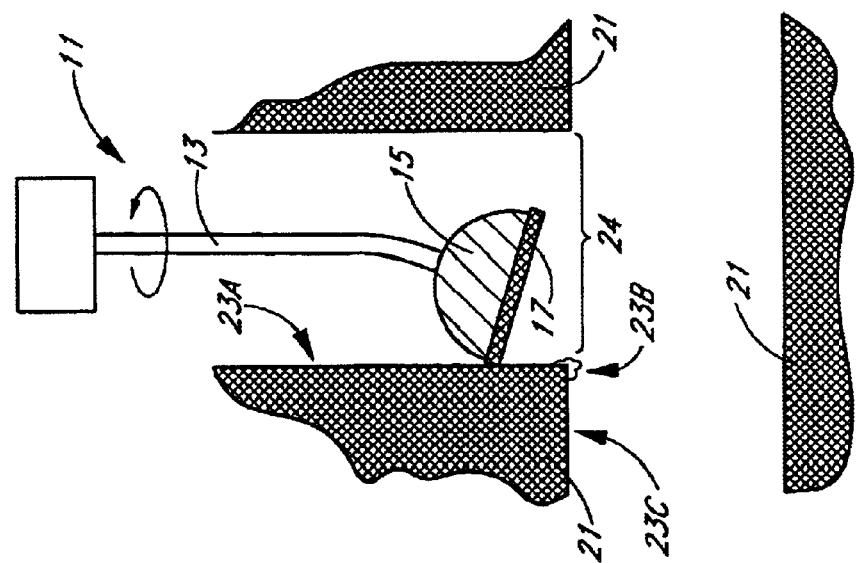

FIGS. 1A and 1B illustrate one embodiment of the apparatus 11 in use in a relatively inaccessible space. The apparatus 11 includes a rotatable shaft 13 that is approximately concentrically attached to an approximately cylindrically symmetric abrasive mechanism 15 that is adjacent to a collar 17 of relatively non-abrasive material, such as wood, plastic, rubber or soft metal (Mohs hardness less than 5.5). The collar 17 is attached to the shaft 13 and/or to the abrasive mechanism 15 so that the abrasive mechanism and the collar rotate when the shaft is caused to rotate, for example, using a shaft driver (rotator) mechanism 19, such as a motor. In FIG. 1A, when the tool 11 is being moved into position in an aperture or opening 24 for deburring one or more surfaces of a workpiece 21, the workpiece is exposed to the collar 17 but is not exposed to the abrasive mechanism 15. This prevents the abrasive mechanism from scoring, gouging or otherwise removing materials from one or more surfaces, 23A, 23B and 23C, of the workpiece 21. The abrasive mechanism may include one or more materials, such as boron nitride, boron carbide, tungsten carbide and alumina, having a Mohs hardness substantially greater than that of most metals (i.e., at least equal to about 5.5).

The shaft 13 need not be located at the center of the aperture or opening 24 in which the tool operates. The workpiece 21 may be caused to rotate about a central axis in the aperture or opening 24, independently of whether or not the shaft 13 and abrasive mechanism 15 are rotating.

When the tool 11 has been moved into a desired position, as shown in FIG. 1B, the collar 17 is repositioned or moved aside to expose a burred surface or other region, such as 23B, to the abrasive mechanism 15 for burr removal. The abrasive mechanism 15 can also be repositioned to remove one or more burrs from another surface, such as 23A, of the workpiece 21.

The abrasive mechanism 15 need not be approximately cylindrically symmetric and/or the shaft 13 need not be approximately concentrically attached to the abrasive mechanism. In this modified configuration, when the shaft 13 is rotated, a portion, but not all, of the abrasive mechanism 15 will contact a surface, such as 23A, 23B or 23C, and will remove burrs by contact. This effect can also be achieved by rotating the shaft 15 off-center.

Figure 2:
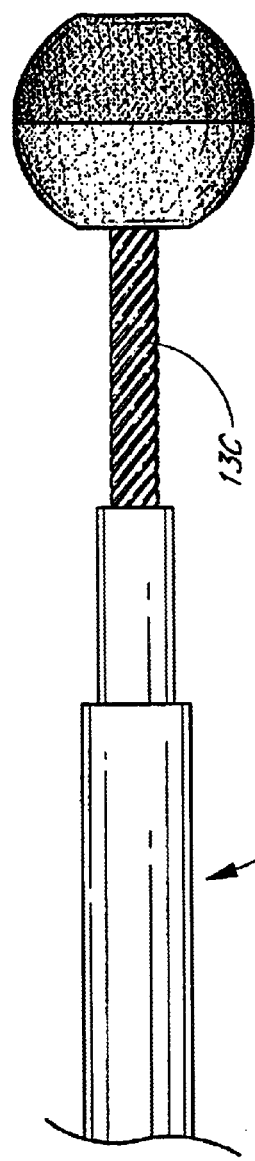
FIGS. 2 and 3 illustrate flexible shaft configurations that can be used with the invention.
Figure 3:
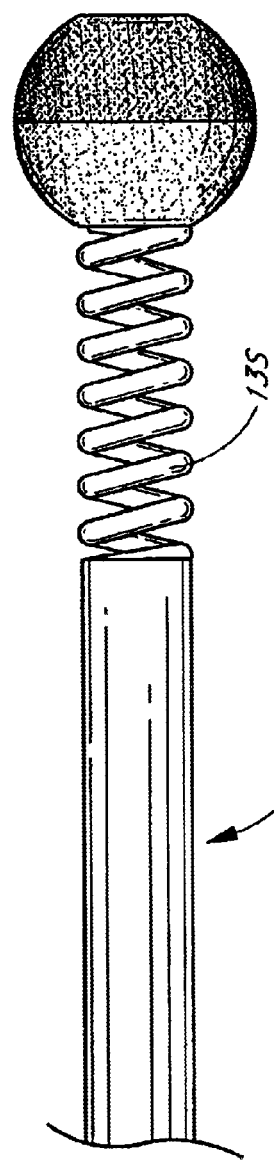

The shaft 13 is preferably flexible enough to permit the shaft to bend or flex a modest amount, either as the shaft rotates or as lateral force is applied to the collar 17 and/or abrasive mechanism 15. FIGS. 2 and 3 illustrate two flexible shaft configurations that permit a portion of the shaft 13 to bend as the abrasive mechanism 15 or the collar 17 is pressed against a surface of the workpiece. This bending of the shaft allows additional force to be applied in encouraging the abrasive mechanism 15 to contact the portion of the workpiece that is to be deburred. In FIG. 2, the shaft 13 includes a central cable 13C that bends modestly as force is applied. In FIG. 3, a portion of the shaft includes a spring 13S that bends more easily under a lateral force. Other flexible shaft configurations (not shown) include a shaft including a portion that is hard rubber and a shaft including a washer/spring.

Figure 4A:
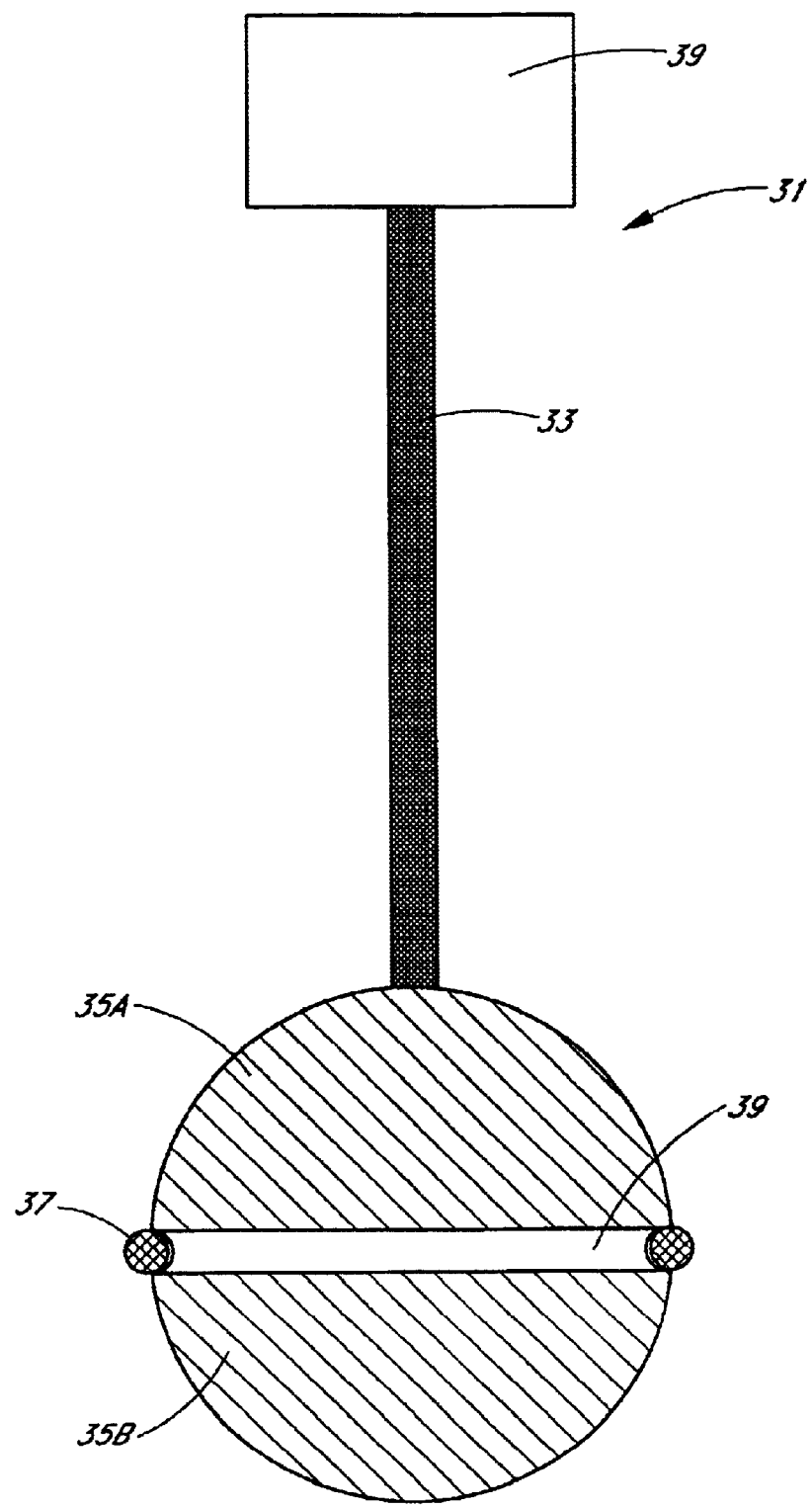

FIG. 4A illustrates another embodiment 31 of the invention. A shaft 33, preferably flexible, is attached to a first approximately cylindrically symmetric abrasive mechanism 35A, and the shaft and/or the first abrasive mechanism is attached or connected to a second approximately cylindrically symmetric mechanism 35B. The first and second abrasive mechanisms, 35A and 35B, are spaced apart by a groove 39, or by empty space if desired. A non-abrasive collar or snap ring 37 is positioned between, or adjacent to, the first and second abrasive mechanisms, 35A and 35B, which may include the same abrasive material or different abrasive materials, as desired.

If the abrasive materials for the two mechanisms are different, the first abrasive mechanism 35A and the second abrasive mechanism 35B may be used for different purposes on the same container or housing. For example, the second abrasive mechanism 35B may be used for rough burr removal from the surface(s), and the first abrasive mechanism 35A may be used for smoothing and finishing of the same or different surface(s).

In this embodiment, the collar 37 serves another purpose as well, namely ensuring that a surface is exposed to at most one of the two abrasive mechanisms, 35A and 35B, at any one time. The tool 31 may include a shaft drive mechanism (motor or other rotator mechanism) 39 to rotate the shaft 33.

The lower abrasive mechanism 35B serves another purpose as well. When the tool 31 is being moved into position in an aperture or opening, passage of the tool through the aperture may be blocked by one or more burrs that extend laterally from a side wall or surface that partly defines the aperture. When such blockage occurs, the lower abrasive mechanism 35B may be activated to remove, or reduce the size of, the projection so that the tool can be moved to its desired location within the aperture. The upper abrasive mechanism 35A can be used for a similar purpose.

Figure 4B:
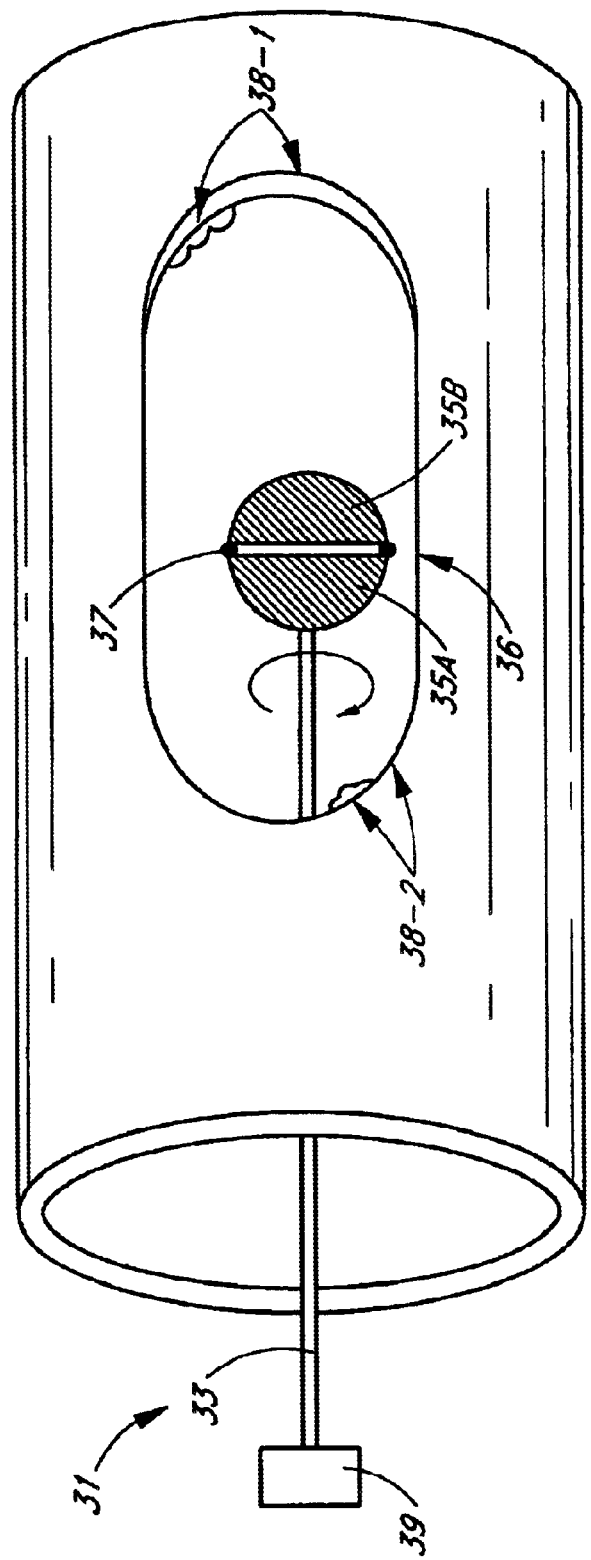

FIG. 4B illustrates use of the embodiment 31. An abrasive mechanism 35 includes first and second approximately cylindrically symmetric abrasive mechanisms, 35A and 35B, and is attached to a shaft 33 driven by a shaft drive mechanism 39. As the embodiment 31 is inserted into an aperture or hole 36 (or is removed from the aperture or hole), the second abrasive mechanism 35B encounters a first surface 38-1 and removes exposed burrs from the first surface. Subsequently, the first abrasive mechanism 35A encounters a second surface 38-2 and removes exposed burrs from the second surface. If only one abrasive mechanism, for example, 35A, is provided, burrs could not be removed from the first surface 38-1, except by removing the embodiment 31 and inserting it into the aperture 36 with the opposite orientation.

Figure 5:
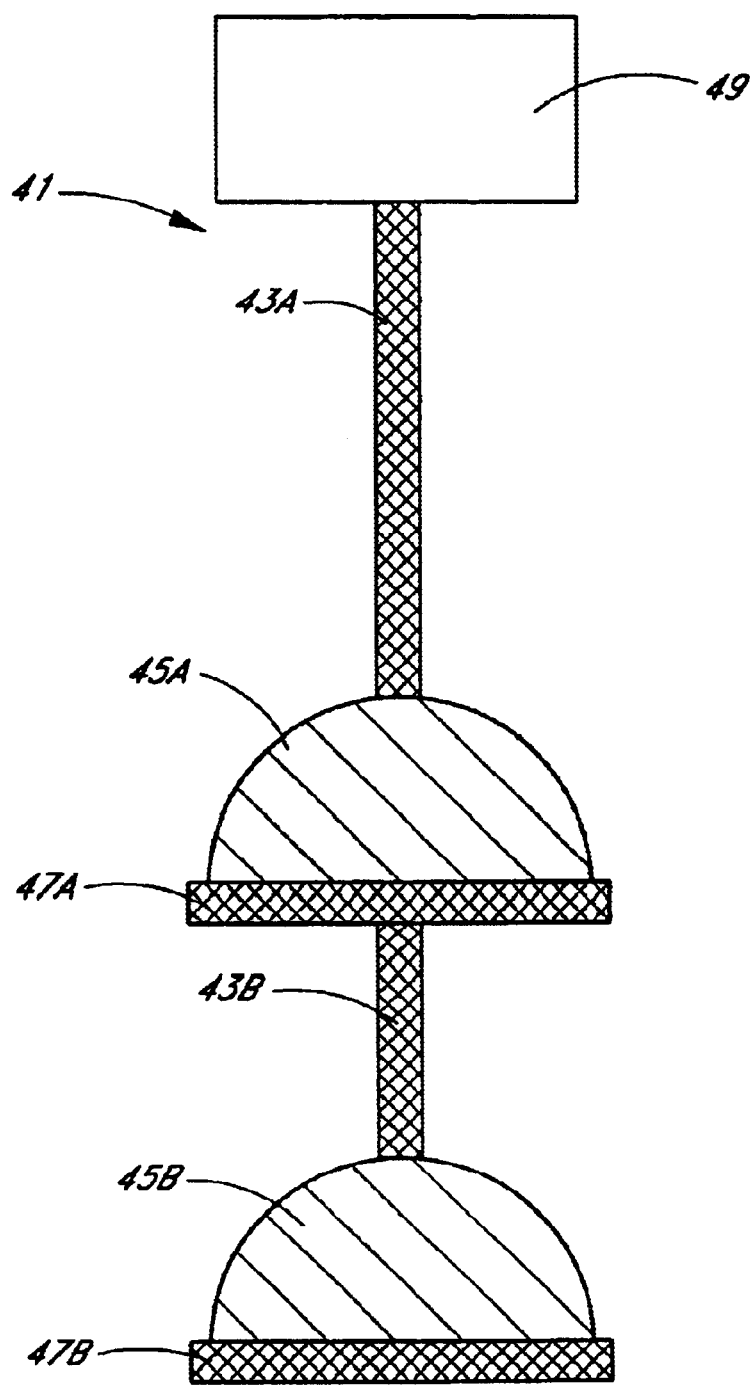

FIG. 5 illustrates another embodiment 41 of the invention, which includes a first shaft 43A and a second shaft 43B, with one or both of the shafts preferably being flexible and preferably being approximately concentric. Optionally, the first and second shafts, 43A and 43B, are parts of a single, unitary shaft. One or both of the shafts, 43A and 43B, is attached or connected to a first abrasive mechanism 45A, which has a first non-abrasive collar 47A, and the second shaft 43B is attached or connected to a second abrasive mechanism 45B that is contiguous to or spaced apart from the first abrasive mechanism 45A and that has a second non-abrasive collar 47B. The first and second abrasive mechanisms, 45A and 45B, may have the same abrasive materials or may have different abrasive materials. The tool 41 may include a motor or other shaft driver mechanism 49 to rotate the shafts 43A and 43B.

Figure 6:
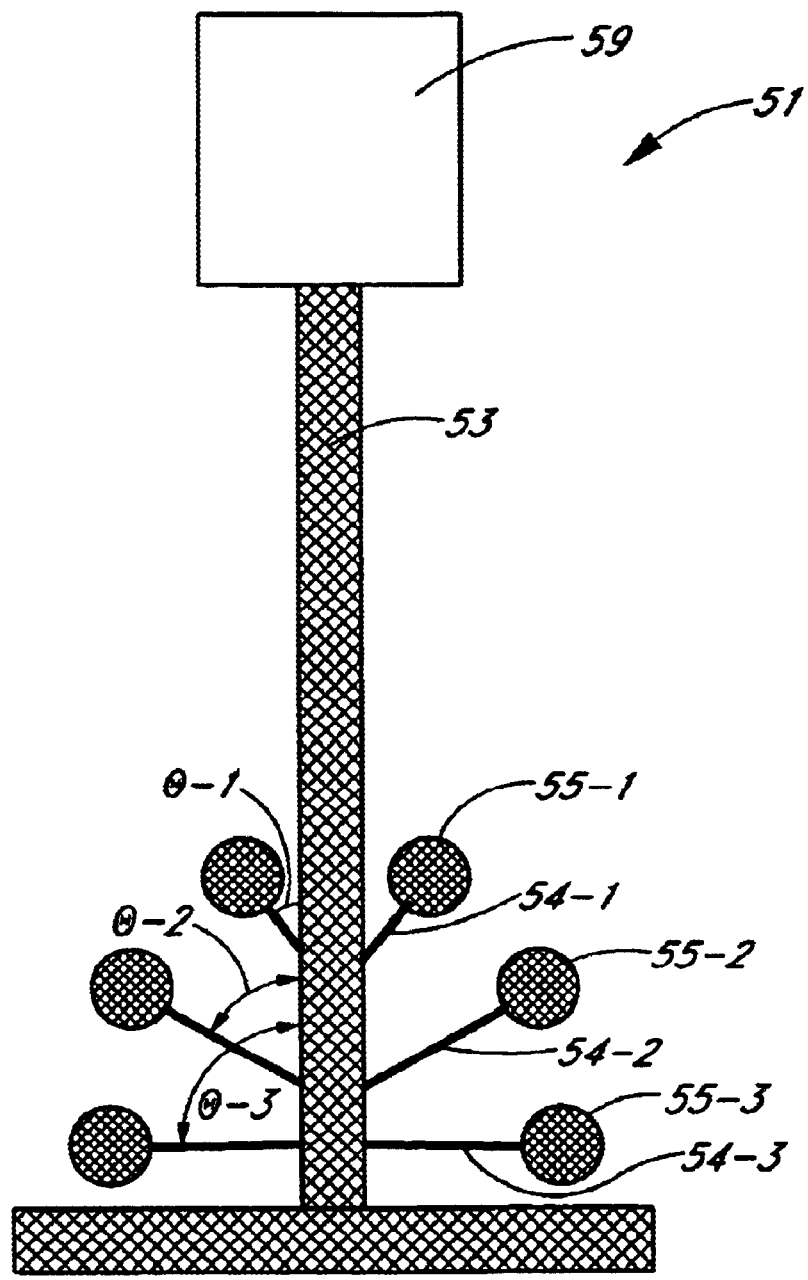

FIG. 6 illustrates another embodiment 51 of the invention, in which a rotatable shaft 53 is provided with a plurality of laterally oriented rods or projections, 54-1, 54-2 and 54-3, that are anchored in, and extend horizontally or diagonally outwardly from, the shaft. Each of the projections, 54-1, 54-2 and 54-3, has an abrasive nodule, 55-1, 55-2 and 55-3, respectively, mounted at or near the end of the respective projection. As the shaft 53 rotates, one or more of the abrasive nodules, 55-1, 55-2 and 55-3, is caused to move outward by centrifugal force, to contact a burred surface and to thereby remove one or more burrs from the burred surface. This contact may occur because centrifugal force exerted on the nodules by the shaft rotation causes one or more of the projections, 54-i (i=1, 2, 3), to bend so that a corresponding projection angle θ-i approaches 90° and the corresponding nodule 55-i moves as far as possible from the shaft 53 to which the nodule is attached. The tool 51 may include a motor or other shaft driver mechanism 59 to rotate the shaft 53.

In any of the embodiments shown in FIGS. 1A, 1B, 4A, 4B, 5 and/or 6, the workpiece having a burred surface may be rotated around a central axis independently of whether or not the shaft and abrasive mechanism are rotated, for burr removal. Rotation of the workpiece may provide faster and/or more uniform deburring of a burred surface.

The abrasive material used in an abrasive mechanism may be a high-carbon steel, a metal impregnated with alumina or boron nitride or boron carbide or diamond fragments, titanium, tungsten, a stiff wire brush, a polishing stone or any other suitable burr removal material.

The non-abrasive material used in a collar may be a plastic or other sacrificial material or may be a material with a Mohs hardness index that is below but near that of the metal from which burrs are to be removed. Many metals have Mohs hardness indices of around 5.5 so that a non-abrasive material with a Mohs hardness index in the range 3-5 may be suitable.

FIGS. 7A and 7B illustrate a deburring tool 71 having a relatively inflexible rotatable shaft portion 73-1, an abrasive mechanism 75, and a rotatable flexible shaft portion 73-2 positioned between and connected to the inflexible shaft portion and the abrasive mechanism. Preferably, the flexible shaft portion 73-2 is a flexible joint or spring that can move laterally relative to the inflexible shaft axis AA, when the shaft 73-1 is rotated with an angular velocity ω, and thereby contact a side wall 78 of a workpiece 79 from which one or more burrs is to be removed. A collar 77 of non-abrasive material extends laterally beyond the abrasive mechanism 75 to prevent the side wall 78 from scoring or gouging when the deburring tool 71 is being moved into place or is being removed from a region adjacent to the workpiece 79. As the inflexible shaft portion 73-1 spins about its axis AA, the flexible joint 73-2 is moved laterally by a centrifugal force, by a lateral distance that is at least partly controlled by the angular velocity or spin speed ω of the inflexible shaft portion 73-1.

Figure 8B:
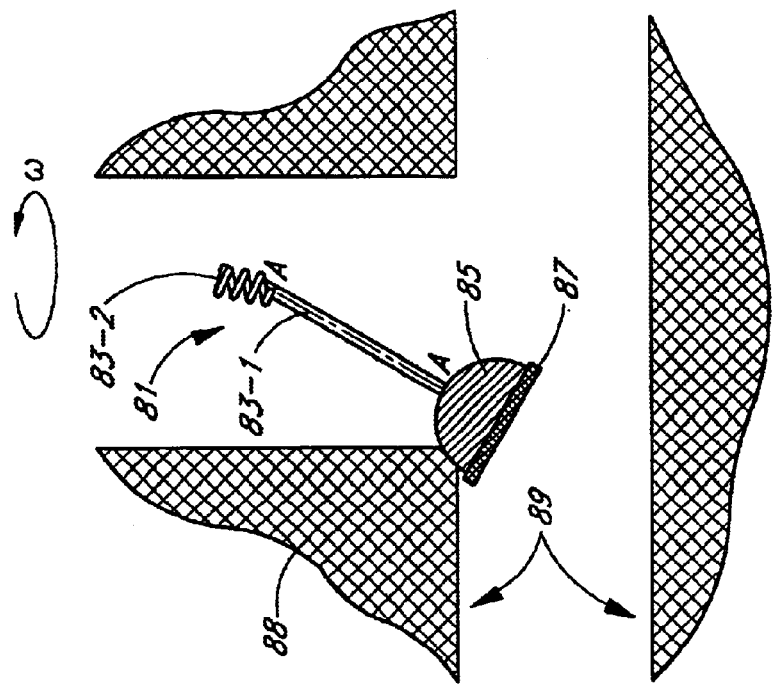
Figure 8A:
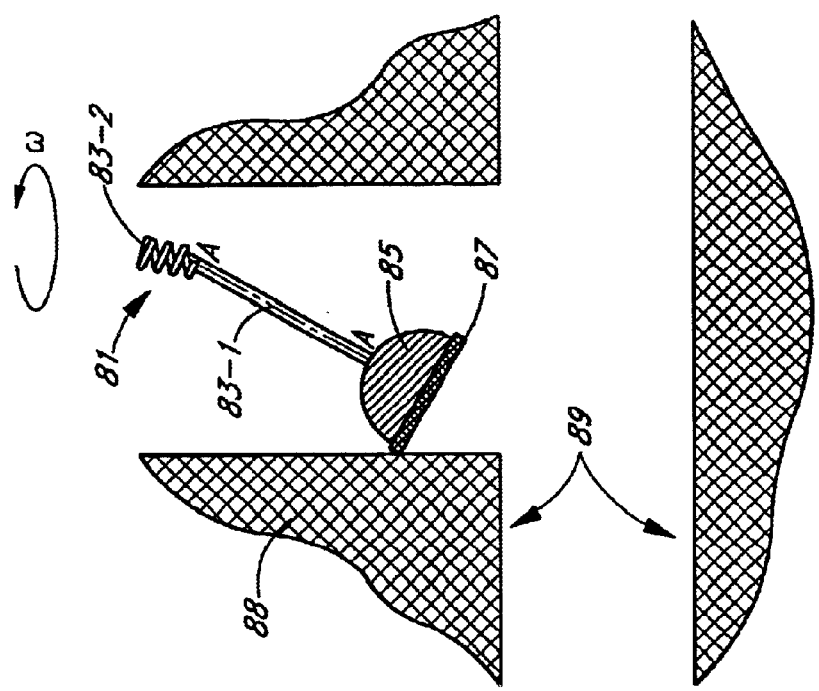

In another alternative for a deburring tool 81, illustrated in FIGS. 8A and 8B, a rotatable inflexible shaft portion 83-1 may be positioned between a rotatable flexible shaft portion 83-2 and an abrasive mechanism 85 with collar 87 on a deburring tool 81 to deburr a sidewall 88 of a workpiece 89. In any of the embodiments shown in FIGS. 7A, 7B, 8A and 8B, the shaft may have a hollow core that partly or fully surrounds the spring shown in each of these figures. A shaft core may include one, or more than one, spring. A shaft core may include a flexible shaft portion and a substantially inflexible shaft portion. In any of the embodiments disclosed herein, a collar may be a substantially solid disk or may be a substantially annular disk.

In another alternative for a deburring tool 91, illustrated in FIGS. 9A and 9B, a rotatable shaft 93 (preferably relatively inflexible) extends from a rubber or other deformable shaft holder 92 at one end of the shaft to an abrasive mechanism 95 with a collar 97 at another end of the shaft 93. The deformable shaft holder 92 allows a longitudinal axis SS of the shaft 93 to become oriented in a direction that is not necessarily parallel to an initial longitudinal axis AA of the shaft. As the deformable holder 92 is spun at an angular velocity ω about the axis AA, rotation of the substantial mass of the abrasive mechanism 95 at the end of the shaft 93 will produce some asymmetry in the rotation position of the abrasive mechanism, causing the shaft axis SS to differ in direction and/or in its lateral location relative to the axis AA. The abrasive mechanism 95 will "wobble" as it spins and will move closer to a side wall 98 of the workpiece 99 to provide deburring action.

When the shaft 93 and abrasive mechanism 95 are spun up for deburring, the shaft holder 92, whether deformable or otherwise, may develop a crack or fissure. The crack may propagate through and fragment the shaft holder and cause injury to the workpiece and/or to an operator of the tool 91. Optionally, the shaft holder 92 is provided with a cup, hood or sleeve 98, which may be rigid or deformable, that surrounds the shaft holder and/or shaft on several sides and catches or deflects any portion of the shaft or holder that might fragment and fly off. The cup, hood or sleeve 98 may extend to about the bottom of the shaft holder 92 or may extend below the bottom of the shaft holder, as illustrated in FIGS. 9A and 9B, respectively. A cup, hood or sleeve 98 may be provided for any of the tool embodiments disclosed here.

Figure 10:
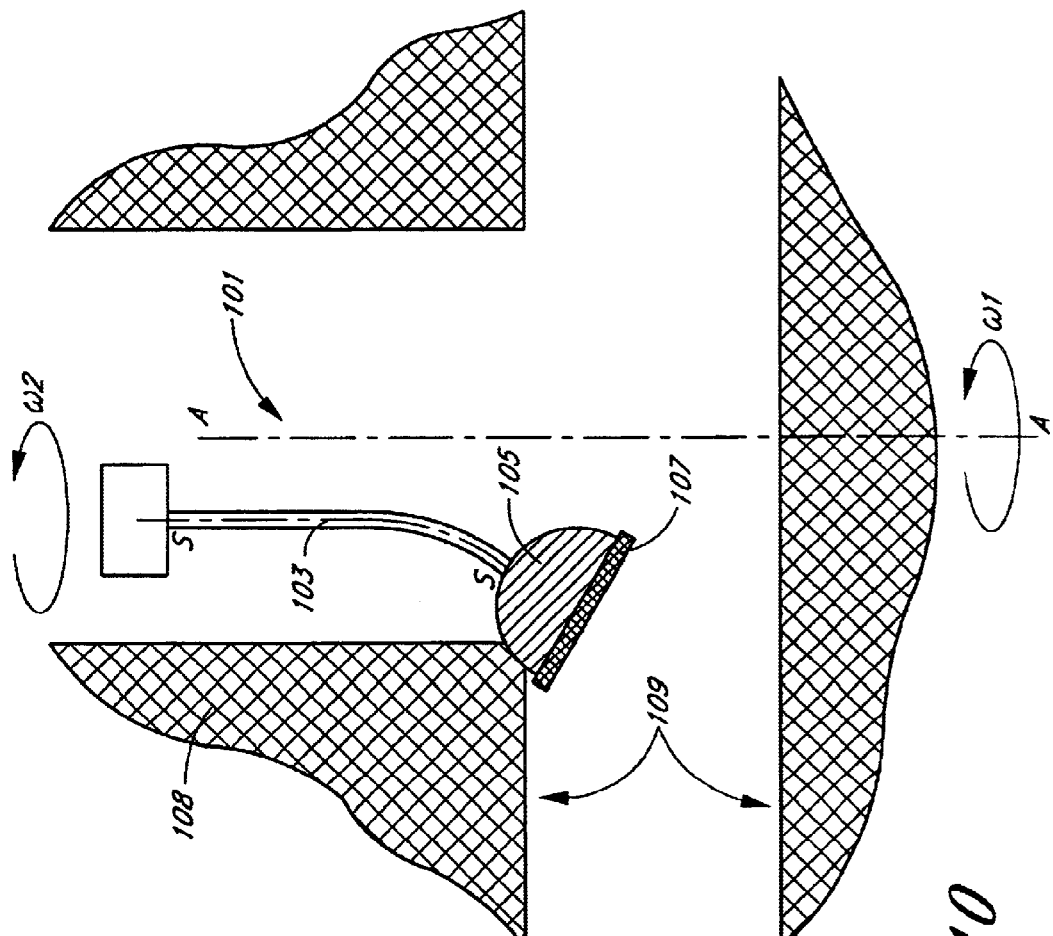
FIGS. 10 and 12A–12D illustrate systems in which both shaft and workpiece rotate.

In another alternative for a deburring tool 101, illustrated in FIG. 10, a workpiece 109 with side wall 108 rotates at a first angular velocity ω1, and a rotatable shaft 103 with abrasive mechanism 105 and collar 107 rotates at a second angular velocity ω2. Optionally, the workpiece 109 and the abrasive mechanism 105 move in opposite circumferential directions (e.g., clockwise and counterclockwise, respectively) with arbitrarily chosen angular velocities, or move in the same circumferential direction with different angular velocities (ω1≠ω2). A rotational axis SS for the shaft 105 is off-center relative to a longitudinal axis AA that serves as center of rotation for the workpiece 109, and the abrasive mechanism 105 will "wobble" as the abrasive mechanism rotates and provide deburring action. In any of the FIGS. 1AB, 4, 5, 6, 7AB, 8AB, 9AB, 10, 11AB, 12 and 14, the workpiece and the deburring tool may rotate in opposite directions and/or at different angular velocities.

Figure 11B:
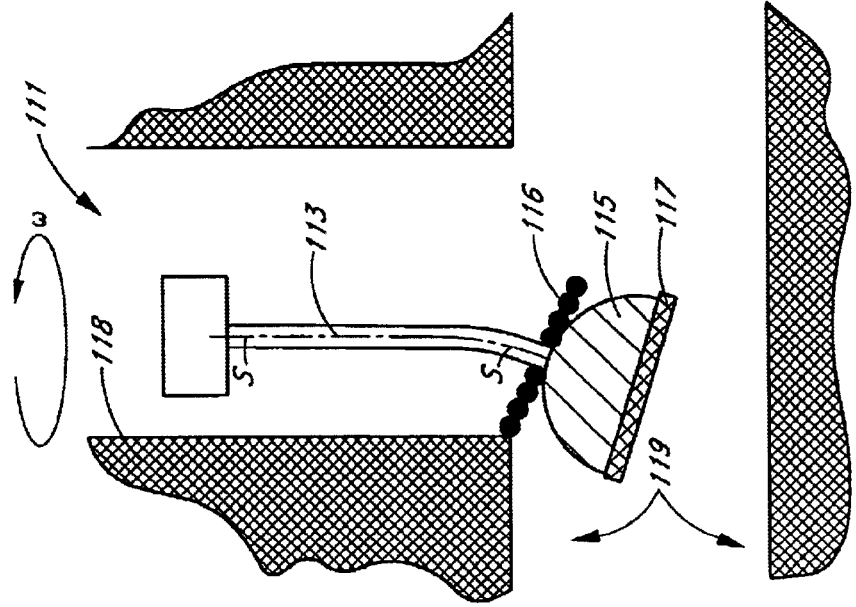
FIGS. 11A and 11B illustrate a system having two abrasive mechanisms.
Figure 11A:
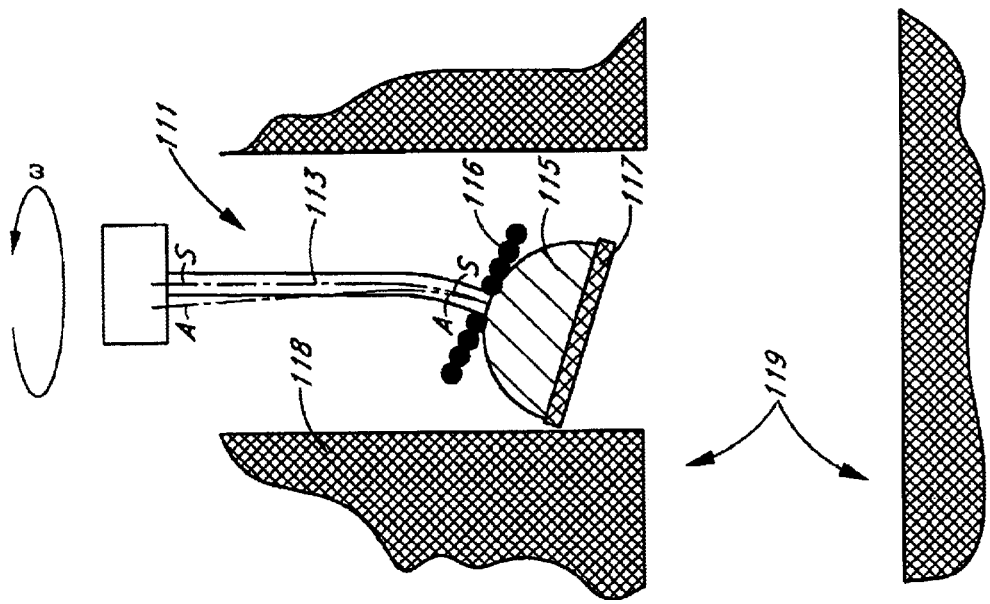

In another alternative for a deburring tool 111, illustrated in FIGS. 11A and 11B, a rotatable shaft 113 has at one end thereof a first abrasive mechanism 115, a collar 117 and a second abrasive mechanism 116, extending laterally as a plate of finite thickness or as a collection of abrasive projections. When the deburring tool 111 is moved to a first position, shown in FIG. 11A, the first abrasive mechanism provides abrasive action on a side wall 118 of a workpiece 119. When the deburring tool 111 is moved to a second position, shown in FIG. 11B, the second abrasive mechanism 116 provides abrasive action on the side wall 118 of the workpiece 119. The first and second abrasive mechanisms, 115 and 116, are preferably of different abrasive materials (e.g., for rough deburring and for finishing, respectively) so that at least two different deburring tasks can be performed without changing an abrasive mechanism or removing the deburring tool 111 from the workpiece 119.

Figure 12B:
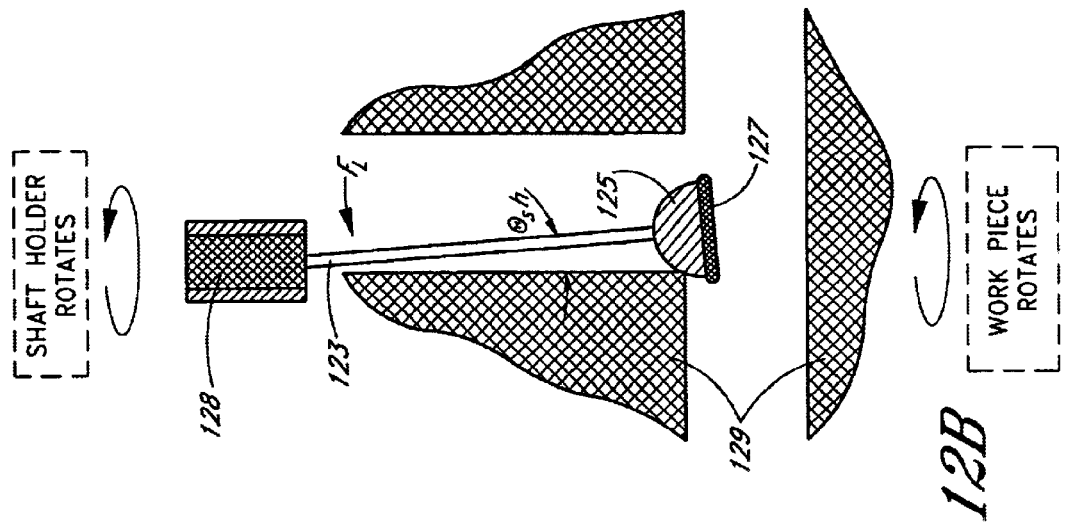
Figure 12A:
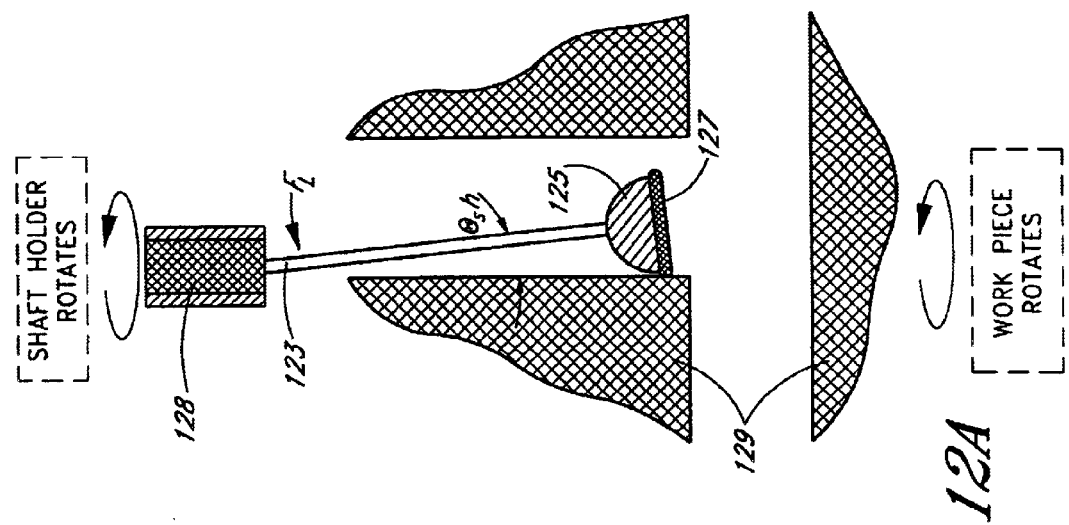
Figure 12D:
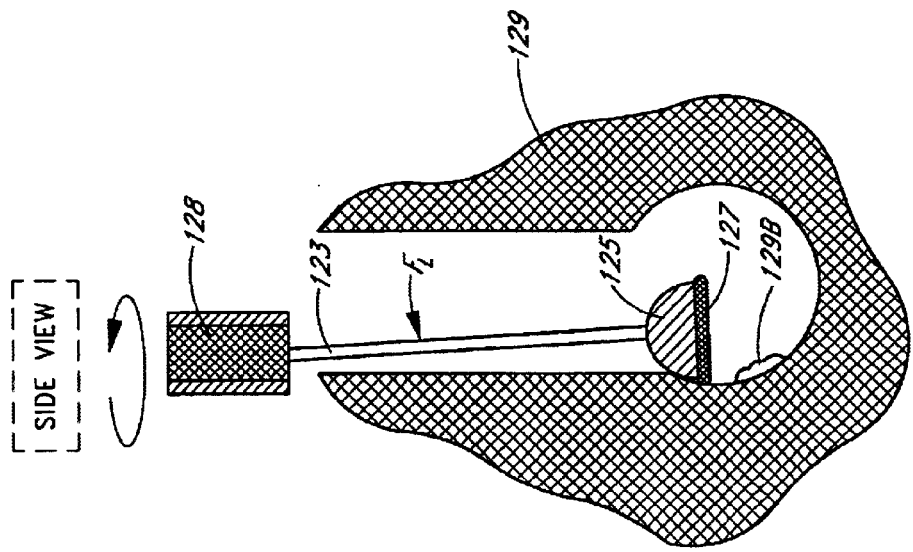
Figure 12C:
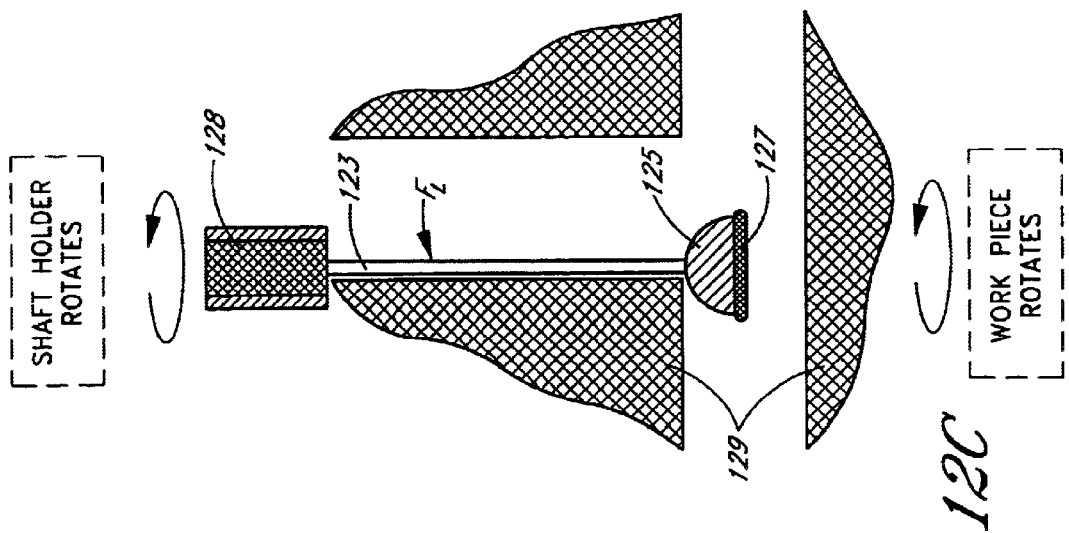

FIGS. 12A, 12B and 12C are side views illustrating positioning and use of the invention when a rotating workpiece 129 is in a first angular position. In FIG. 12A, the tool 120 is being moved longitudinally into position. A collar 127 of the tool contacts a surface of a workpiece 129 and holds an abrasive mechanism 125 away from the surface. Because of this hold-off, a shaft 123, to which the abrasive mechanism 125 and collar 127 are connected, is positioned at a non-zero angle $\theta_{sh}$ relative to an adjacent surface of the workpiece 129. This non-zero angle $\theta_{sh}$ is achieved by application of a lateral force $F_L$ that bends or otherwise reorients a longitudinal axis of the shaft 123, which is held by a drive mechanism and (flexible or rigid) shaft holder 128. As the tool 120 moves longitudinally, the collar 127 initially moves beyond a corner C of the workpiece 129, and the angle $\theta_{sh}$ is reduced to a smaller, but non-zero, angle, as illustrated in FIG. 12B.

As the tool 120 moves further longitudinally, the abrasive mechanism 125 makes contact with the corner C, and the angle $\theta_{sh}$ is reduced to substantially zero, as illustrated in FIG. 12C, and a side wall of the workpiece 129 is directly exposed to the abrasive mechanism 125. In each of FIGS. 12A, 12B and 12C, the workpiece 129 is in a first angular position, and only a first aperture 129A in the workpiece 129 is shown.

In FIG. 12D, the rotating workpiece 129 has rotated to a second angular position (approximately 90° from the first position). In this second angular position, the workpiece 129 has an associated aperture 129B that extends through at least part of the workpiece in a direction transverse to the plane of the FIGS. 12A, 12B and 12C. With the workpiece 129 rotated to this second position, the abrasive mechanism 125 will need to re-orient itself in order to contact and remove a burr 121 that is located within the second aperture 129B. In this situation, the shaft 123 and abrasive mechanism 125 might be (re)introduced into the second aperture 129B along an axis of this aperture, in order to contact and remove the burr 121.

Alternatively, in several; of the embodiments illustrated herein (e.g., in FIGS. 1B, 7B, 8B, 9B, 10, 12A-12D, 16A-16B and 17B), the workpiece can be held against a movable table and the table can be caused to rotate slowly while the abrasive mechanism of the deburring tool rotates more quickly in the same direction or in an opposite direction. This approach will cause a workpiece that has a vertical first aperture and a horizontal second aperture to move as illustrated, for example, in FIGS. 12A-12D.

In another alternative for a deburring tool 131, illustrated in FIG. 13, the axis AM—AM of an abrasive mechanism 135, which extends laterally from a rotatable shaft 133, can be rotated by an arbitrary angle relative to a longitudinal axis AA. By rotating the axis AM—AM, and thus changing the angular orientation of the abrasive mechanism 135 by an angle θ, the abrasive mechanism can be oriented as shown to remove burrs on a rounded or polygonal corner C of a side wall 138 of a workpiece 139. The material used in the abrasive mechanism 135 can be a relatively hard abrasive for rough deburring or can be a relatively soft abrasive for surface finishing. Optionally, the abrasive mechanism 135 includes one, two or more non-abrasive collars, 137A and 137B, to protect the side wall 138 as the deburring tool 131 is mover into position or is removed from the workpiece 139.

Preferably, the shaft 143 includes a superelastic shaft core 143-1 that easily bends into an arc and continues to rotate about its (now-curved) axis S'S', as illustrated in FIG. 14. The shaft 143 also includes: a partly flexible shaft guide sleeve 143-2 that covers most of, and may but need not rotate with, the shaft core 143-1; and an inflexible guide sleeve 143-3 that covers part of the shaft guide sleeve 143-2 and does not rotate.

In FIG. 13, the cross-sectional shape of the abrasive mechanism 135 is curvilinear and concave, to more easily abrade a rounded corner on a side wall 138. In an alternative embodiment of a deburring tool 151, illustrated in FIG. 15, the cross-sectional shape of the abrasive mechanism 155 is concave and has at least one linear segment (or is polygonal), with geometric parameters that enable the abrasive mechanism 155 to remove burrs on a sharply angled polygonal corner C' (e.g., a right angle corner) by rotation of the shaft axis S'S' relative to an initial longitudinal axis for the tool.

Figure 16A:
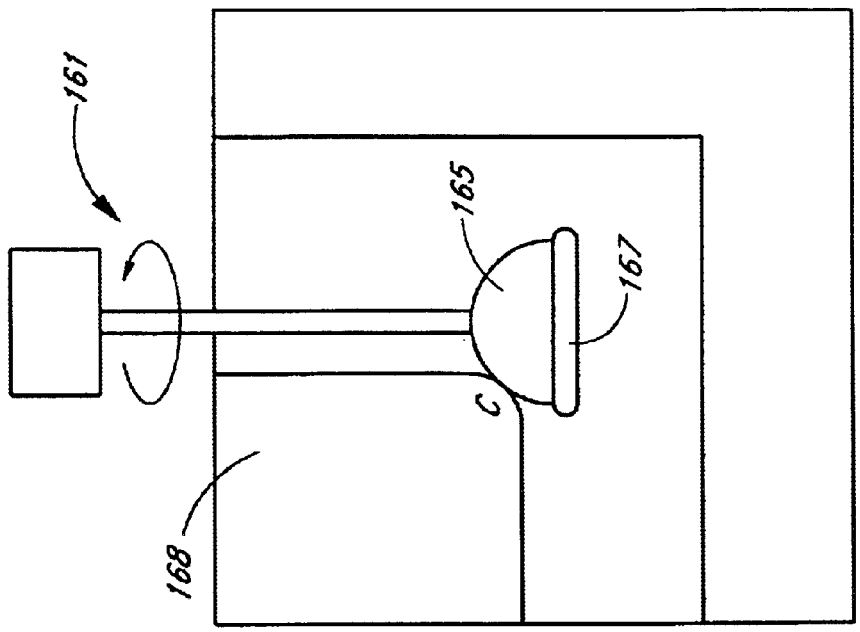
FIGS. 16A and 16B illustrate suitable abrasive mechanism cross-sectional shapes for use with curvilinear and polygonal corners.
Figure 16B:
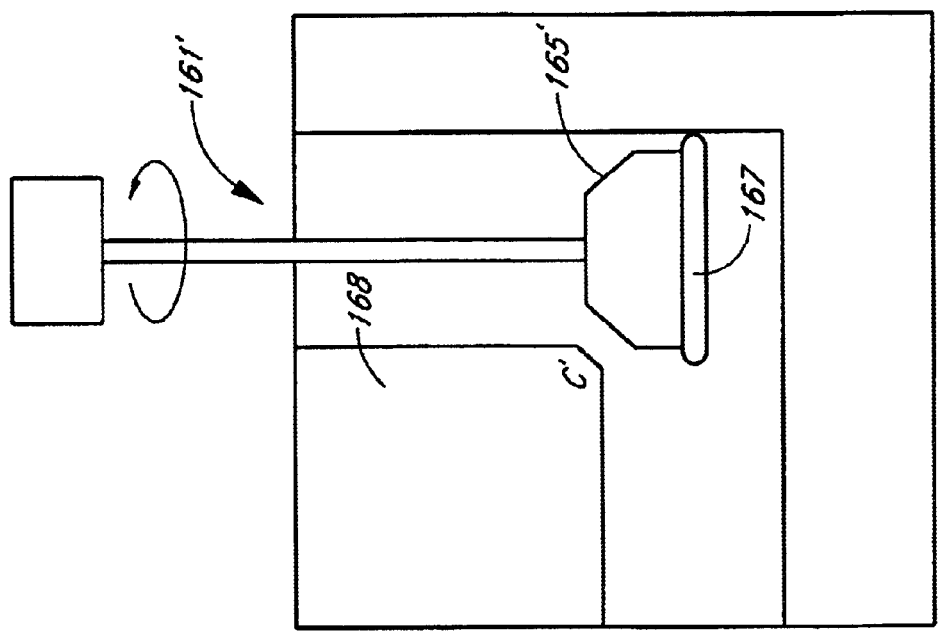

In the systems 161 and 161' illustrated in FIGS. 16A and 16B, the cross-sectional shape of the abrasive mechanism is convex curvilinear or ovular (165 in FIG. 16A) and convex polygonal (165' in FIG. 16B), respectively. The convex curvilinear cross-sectional shape shown in FIG. 16A is best suited for removing burrs and other unwanted material from a corner C on a curved convex surface, as illustrated, having a local radius of curvature that is at least as large as the radius of curvature of the abrasive mechanism. The convex polygonal cross-sectional shape (including, but not limited to, triangular and quadrilateral) shown in FIG. 165B is best suited for removing burrs and other unwanted material from a corner C' on a relatively flat or polygonal shape local surface, as illustrated, where the abrasive mechanism surface can be oriented approximately parallel to the local surface and thus avoid or minimize removal of material other than burrs.

Figure 17A:
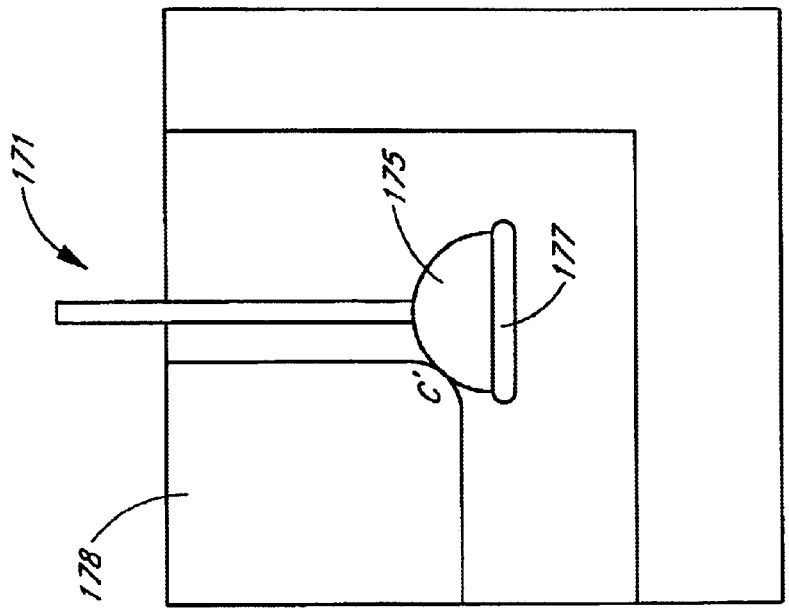
FIGS. 17A and 17B illustrate use of a deburring tool to reshape a corner in a side wall.
Figure 17B:
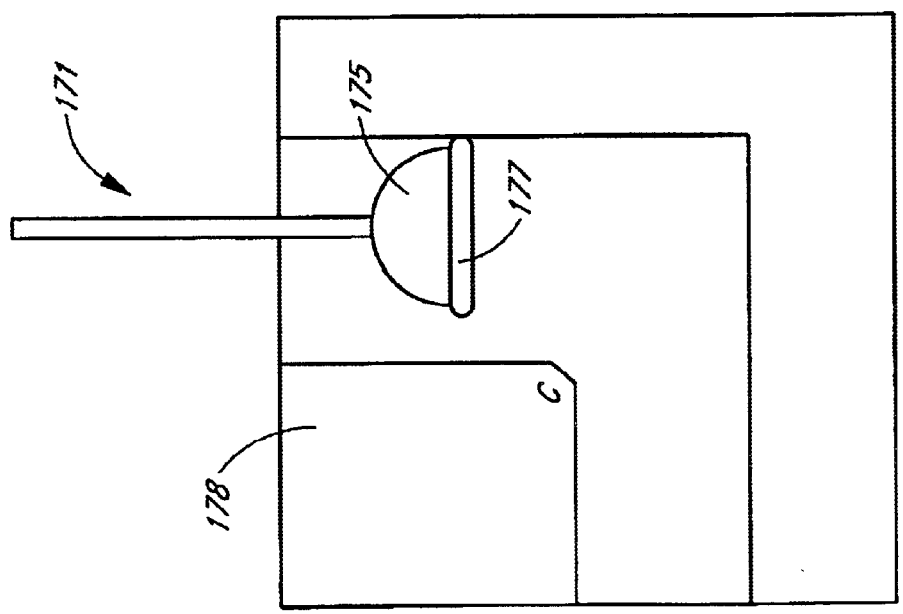

As illustrated by the system 171 shown in FIGS. 17A and 17B, an abrasive mechanism 175 with a curvilinear shape on a deburring tool 171 can be positioned and operated to convert a corner C having a polygonal cross-sectional shape on a side wall 178 (FIG. 17A) into a corner C' having a curvilinear cross-sectional shape (FIG. 17B). Using an abrasive mechanism with a polygonal shape, such as 165', shown in FIG. 16B, one can convert a corner C' (FIG. 17B) into a corner C (FIG. 17A).

Side and end views in FIGS. 18A, 18B and 18C illustrate use of a shaft restrictor 181 to restrict motion of a shaft 182 in any lateral direction as the shaft turns and the abrasive mechanism 183 encounters mechanical resistance. Two spaced apart locations, 182A and 182B, of the shaft are received by corresponding aligned apertures, 184A and 184B, in a first curved or shaped plate 185. Preferably, the first plate 185 is connected or rigidly attached to a shaft driver mechanism 186 (e.g., a motor), or to some other relatively rigid device, by a second plate or anchor 187 so that the first plate 185 does not move relative to the shaft drive mechanism 186 as the shaft 182 turns within the apertures, 184A and 184B. Presence of the two aligned apertures, 184A and 184B, surrounding the shaft 182 at spaced apart locations helps to ensure that the shaft itself is aligned and moves at most a minimal lateral distance as the shaft rotates. Preferably, the aperture diameters, d(184A) and d(184B), are slightly larger than the shaft diameter d(182). Optionally, the aperture diameter d(184A) differs slightly from the aperture diameter d(184B), in order to more accurately align the shaft 182 within the apertures, 184A and 184B.

The plate 185 and apertures, 184A and 184B, in FIG. 18A can be replaced by, or supplemented by, two spaced apart collars, 188A and 188B, that align, and restrict the lateral motion of, the shaft 182, as illustrated in FIG. 18D.

The end view in FIG. 18B (or 18C) illustrates a shaft restrictor 181 to restrict motion of the shaft 182 in any lateral direction as the shaft turns, using the first plate 185 with a single aperture (184A or 184B), where the first plate is preferably connected or rigidly attached to the shaft drive mechanism 186 by the second plate or anchor 187. Use of a shaft restrictor 181 with a single aperture does not align the shaft 182 as well as the shaft restrictor 181 aligns the shaft, but in other respects the single-aperture and two-aperture shaft restrictors perform similarly.

Figure 19:
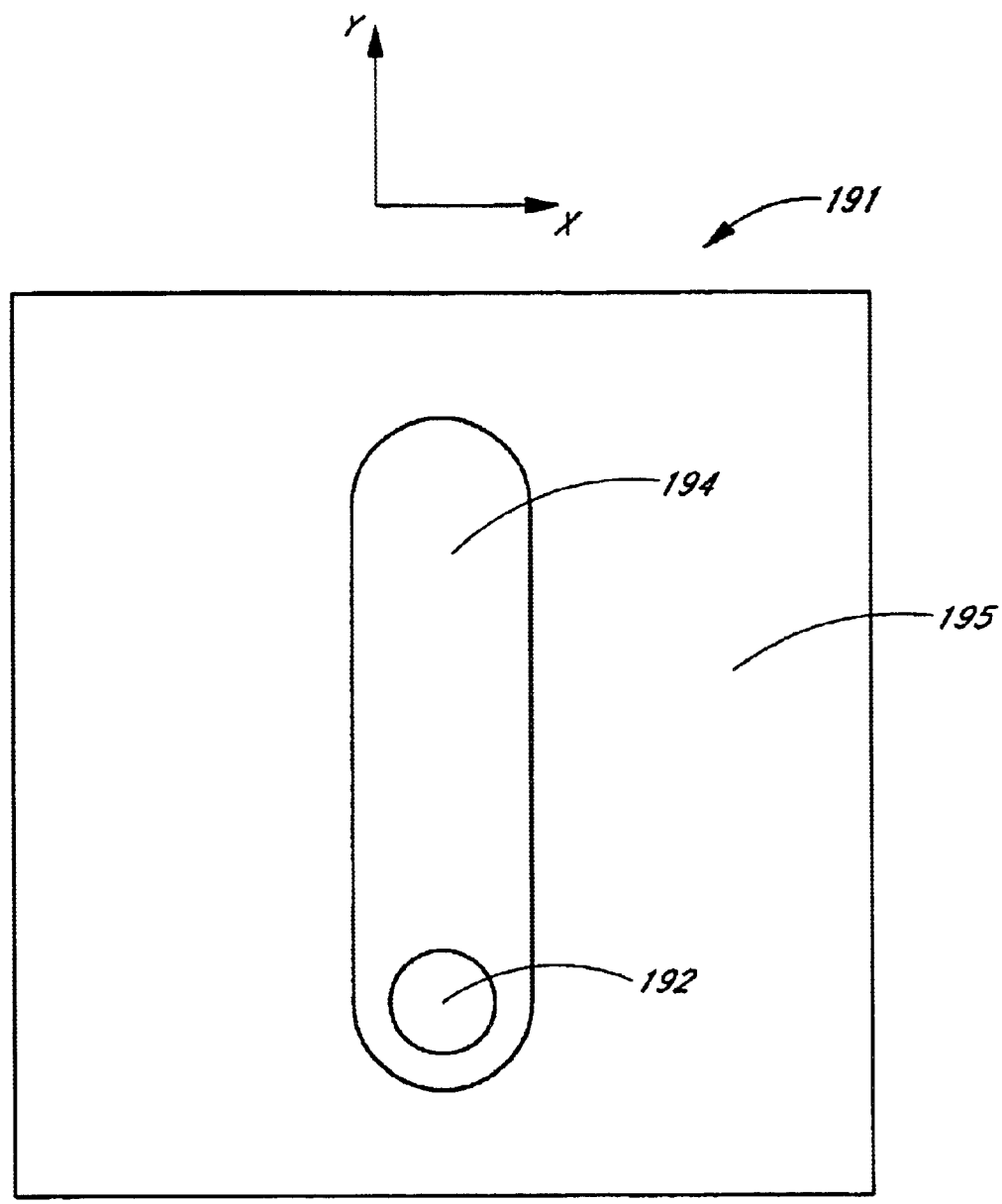

In FIG. 19, a shaft restrictor 191 includes a plate 195 with an aperture 194 that restricts motion of a shaft 192 in one lateral direction (x) but permits motion of the shaft in a second lateral direction (y). The shaft restrictor 191 shown in FIG. 19 will be useful where an abrasive mechanism and shaft must move in one lateral direction to follow the contours of the workpiece to be deburred.

FIGS. 20A, 20B and 21 are end and side views illustrating an arrangement that incorporates some of the invention's features in a milling machine or lathe, for example, as a retrofit arrangement. FIGS. 20A and 20B are end views of a rotation machine 201, such as a lathe or milling machine, that has a rotatable base 202 having a longitudinal central axis 203 and having one or more apertures 204-j (j=1, ..., J; J≧1) formed in the base. One or more of the apertures 194-j has a subsidiary rotation mechanism 205-j positioned therein that provides independent rotation of a shaft 206-j. The subsidiary rotation mechanism 205-j can serve as a shaft drive mechanism for a burr removal system, such as the system shaft drive mechanism 19 shown in FIGS. 1A and 1B. For example, the rotatable base 202 can rotate about its axis 203 in a clockwise direction, and the subsidiary rotation mechanism 205-j can independently rotate the shaft 206-j in a clockwise or counterclockwise direction, as illustrated in FIG. 20A. Alternatively, the shaft 206-j can be held stationary so that only the rotatable base 202 rotates, as illustrated in FIG. 20B.

FIG. 21 is a side view illustrating a subsidiary rotation mechanism 205-j that is connected to an abrasive mechanism 207-j and associated collar 208-j through a rotatable shaft 206-j. Preferably, the shaft 206-j is controllably moved longitudinally, in a direction parallel to an axis BB, to position the abrasive mechanism 207-j relative to the workpiece (not shown). Optionally, the shaft 206-j includes a flywheel or other similar rotatable mass 210-j that provides a rotational inertia storage mechanism. The subsidiary rotation mechanism 205-j is activated and spins up the shaft 206-j, the abrasive mechanism 207-j and the associated collar 208-j to an appropriate angular velocity ω0. The shaft 206-j, the abrasive mechanism 207-j and the associated collar 208-j are then optionally moved longitudinally parallel to the axis of the shaft 206-j until the abrasive mechanism engages a portion of the work surface to be deburred. The subsidiary rotation mechanism 205-j may continue in its activated state to rotate the shaft 206-j, the abrasive mechanism 207-j and collar 208-j. Alternatively, the subsidiary rotation mechanism 205-j is deactivated or turned off; and the shaft 206-j, the abrasive mechanism 207-j and the associated collar 208-j are allowed to continue to rotate at an angular velocity ω that slowly decreases from its initial value ω0, due to internal friction and due to friction encountered by the abrasive mechanism 207-j as one or more burrs is removed. Inclusion of the rotatable mass 210-j on the shaft 206-j provides additional rotational inertia ($\approx I \cdot \omega^2$, where I is the moment of inertia of the rotatable mass alone) that helps to sustain the angular velocity ω near its initial value ω0 in the presence of friction.

Each embodiment of the invention incorporates one or more of the following features: (1) provision of a non-abrasive collar, combined with an adjacent abrasive mechanism, to protect a surface from unintended abrasion when the system is being moved into position to remove one or more burrs; (2) provision of an abrasive mechanism having a cross-sectional shape that corresponds to the local shape of the surface from which one or more burrs is to be removed; (3) provision of a bendable shaft that can be mechanically loaded or bent to provide an abrasive mechanism with a directed force against a surface from which one or more burrs is to be removed; (4) provision of a shaft restrictor that restricts shaft motion in one or more lateral directions when the abrasive mechanism is rotating; and (5) use of rotational inertia storage to sustain rotation of the shaft(s), abrasive mechanism(s) and collar(s) after the shaft drive mechanism is turned off and the angular velocity decreases slowly due to frictional forces.

What is claimed is:

1. Apparatus for removing a burr from a corner along an inner wall of a workpiece, the apparatus comprising:

a flexible shaft that can be rotated about a shaft axis, having a shaft first end, at a selected angular velocity, an abrasive mechanism having a convex proximal surface, connected to a location near a first end of the shaft and including an abrasive material that can abrade the corner of the workplece that is contacted by the abrasive mechanism;

a collar of a selected material that will not substantially abrade the workpiece when the workpiece is contacted by the collar, the collar being fixedly attached to the abrasive mechanism; and whereby, when the abrasive mechanism, the collar and at least a portion of the shaft are inserted into an aperture in the workpiece and the shaft is rotated, at least one burr on the corner along the inner wall of the workpiece can be removed as the convex proximal surface rides along the corner during advancement of the apparatus through the aperture.

2. The apparatus of claim 1, wherein said abrasive mechanism has substantially a cross-sectional shape drawn from a group consisting of a portion of an ovaloid, a portion of a triangle a portion of a quadrilateral, and a portion of a polygon.

3. The apparatus of claim 1, wherein said collar material is drawn from a group of non-abrasive materials consisting of wood, plastic, rubber and soft metal.

4. The apparatus of claim 1, wherein said material for said abrasive mechanism is drawn from a group of abrasive materials consisting of boron nitride, boron carbide, tungsten carbide, alumina high carbon steel, and a metal impregnated with at least one of alumina, boron nitride, boron carbide, tungsten carbide, diamond fragments, titanium and tungsten.

5. The apparatus of claim 1, wherein said shaft has a hollow shaft core.

6. The apparatus of claim 5, wherein said shaft can flex or bend in a selected direction in response to force on said shaft in the selected direction.

7. The apparatus of claim 1, wherein said collar is located at a first end of said abrasive mechanism that is spaced apart from said first end of said shaft.

8. The apparatus of claim 1, further comprising:

a second abrasive mechanism having a convex distal surface, rigidly connected to at least one of said shaft and said first collar and located adjacent to said first collar and including a second abrasive material that can abrade the corner of said workpiece that is contacted by the second mechanism;

whereby, when the second abrasive mechanism and at least a portion of the shaft are inserted into an aperture in said workpiece and said shaft is rotated, at least one burr can be removed as the convex distal surface rides along the corner during advancement of the apparatus through the aperture.

9. The apparatus of claim 8, wherein said second abrasive material is chosen to be substantially less abrasive than said first abrasive material.

10. The apparatus of claim 8, wherein said second abrasive material is chosen to be substantially more abrasive than said first abrasive material.

11. The apparatus of claim 8, wherein said first abrasive mechanism and said second abrasive mechanism are attached to said collar on opposite sides of said collar.

12. The apparatus of claim 1, wherein said collar is an annular mechanism.

13. The apparatus of claim 1, further comprising a shaft driver mechanism, connected to said shaft to cause said shaft to rotate approximately about said shaft axis.

14. A method for removing a burr from a corner along an inner wall of a workpiece, the method comprising:

providing a flexible shaft that can be rotated about a shaft axis, having a shaft first end, at a selected angular velocity;

providing an abrasive mechanism, connected to a location near a first end of the shaft and including an abrasive material that can abrade a selected section of a workpiece that is contacted by a convex proximal surface of the abrasive mechanism;

providing a collar of a selected material that will not substantially abrade the workpiece when the workpiece is contacted by the collar, the collar being fixedly attached to the abrasive mechanism; and whereby, when the abrasive mechanism, the collar and at least a portion of the shaft are inserted into an aperture in the workpiece and the shaft is rotated, at least one burr on the corner along the inner wall of the workpiece can be removed as the convex proximal surface rides along the corner during advancement of the apparatus through the aperture.

15. The method of claim 14, further comprising providing a shaft driver mechanism connected to said shaft, to cause said shaft to rotate about said shaft axis at said selected angular velocity.

16. The method of claim 14, further comprising providing a lateral force in a selected direction against said shaft to force said abrasive mechanism to contact a selected portion of said workpiece in said aperture.

\* \* \* \* \*

UNITED STATES PATENT AND TRADEMARK OFFICE
CERTIFICATE OF CORRECTION

PATENT NO. : 6,846,226 B2  Page 1 of 1
APPLICATION NO. : 09/850908
DATED : January 25, 2005
INVENTOR(S) : Michael Kapgan It is certified that error appears in the above-identified patent and that said Letters Patent is hereby corrected as shown below:

At column 1-2, lines 66-67 and 1-14, delete "An approximately... ... ... ... the rotating shaft." and insert the same on Col. 1, line 65 after "embodiment." as a continuation of paragraph.

At column 2, line 3, delete "(prefereably" and insert -- (preferably --, therefor.

At column 3, line 21, after "mechanism" insert -- 15 --.

At column 10, line 23 (approx.), in Claim 1, delete "velocity," and insert -- velocity; --, therefor.

At column 10, line 27 (approx.), in Claim 1, delete "workplece" and insert -- workpiece --, therefor.

At column 10, line 52 (approx.), in Claim 4, after "alumina" insert -- , --.

At column 12, line 20, in Claim 15, after "mechanism" insert -- , --.

Signed and Sealed this

Twentieth Day of May, 2008

JON W. DUDAS
*Director of the United States Patent and Trademark Office*